(12) United States Patent
Burg et al.

(10) Patent No.: US 12,363,074 B1
(45) Date of Patent: Jul. 15, 2025

(54) SECURITY GROUP CLUSTERING AND CENTRAL MANAGEMENT

(71) Applicant: Algosec Systems Ltd, Petach Tikva (IL)

(72) Inventors: Yaron Burg, Petach Tikva (IL); Yossi Glick, Petach Tikva (IL); Yoni Geva, Petach Tikva (IL); Dovev Liberman, Petach Tikva (IL)

(73) Assignee: Algosec Systems Ltd, Petach Tikva (IL)

( * ) Notice: Subject to any disclaimer, the term of this patent is extended or adjusted under 35 U.S.C. 154(b) by 440 days.

(21) Appl. No.: 17/450,455

(22) Filed: Oct. 8, 2021

(51) Int. Cl.
*H04L 9/40* (2022.01)

(52) U.S. Cl.
CPC ...... *H04L 63/0263* (2013.01); *H04L 63/0236* (2013.01); *H04L 63/205* (2013.01)

(58) Field of Classification Search
CPC ............ H04L 63/0263; H04L 63/0236; H04L 63/205
See application file for complete search history.

(56) References Cited

U.S. PATENT DOCUMENTS

| | | | |
|---|---|---|---|
| 11,356,409 B1* | 6/2022 | Ng | G06F 9/50 |
| 2003/0033430 A1* | 2/2003 | Lau | F16H 55/0886 709/245 |
| 2003/0137935 A1* | 7/2003 | Kagan | H04L 47/32 370/389 |
| 2007/0074288 A1* | 3/2007 | Chang | H04L 43/028 726/22 |
| 2012/0239998 A1* | 9/2012 | Park | H04L 1/1896 714/748 |
| 2016/0156591 A1* | 6/2016 | Zhou | H04L 45/48 726/13 |
| 2017/0195462 A1* | 7/2017 | Kfir | H04L 63/1416 |
| 2022/0103478 A1* | 3/2022 | Ang | H04L 47/781 |

* cited by examiner

*Primary Examiner* — Amie C. Lin
(74) *Attorney, Agent, or Firm* — Reches Patents

(57) ABSTRACT

There may be provided a flow consolidation method, system and non-transitory computer readable medium. The method may include (a) obtaining connection information about a set of connections, wherein each connection comprises a source address, a destination address and a service identifier; and (b) compressing the connection information to provide flow information about a group of flows; wherein each flow comprises a source Classless Inter-Domain Routing (CIDR) block, a destination CIDR block and a service; wherein the compressing comprises determining one or more prefix sizes of CIDR blocks of the group of flows based on a density of the CIDR blocks and one or more additional numeral constraints.

17 Claims, 7 Drawing Sheets

411

SECURITY GROUP CLUSTERING AND CENTRAL MANAGEMENT

BACKGROUND

Security traffic filtering services exist in Firewalls, SDN and Cloud. Large organizations are required to have multiples traffic security policy rules, which ideally allow only the required traffic by the business and block all other communications.

An application is a set of servers that together provide a business service. For example, clients connect to the webserver of the eCommerce website. The webserver has connections to the Application Server which connects to a database server. Each of these servers usually connects to few other services on prem and/or in the cloud. Thus, in order to provide the ecommerce service a group of servers must connect, over communication networks, to each other on specific services.

Many types of networking equipment allow exporting the set of connections associated with a specific application. This network connectivity data can be exported from Onprem network devices, SDN and public cloud, using a variety of formats including NetFlow, SFlow, or full packet traces. In addition to being exported from network or security equipment, network connectivity data can be exported also from traffic metadata aggregators (so called "packet brokers").

In large organizations these sets of network connectivity can consist of tens of thousands of connections for a single application. Trying to define these connections as policy rules that are to be placed onto a security system introduces several challenges.

The challenges may include:
a. Complexity-A security engineer will find it challenging to understand and manage such a large group of policy rules.
b. Resource utilization-Placing large numbers of policy rules on a security system will consume a large amount of computing resources, and the extreme may exceed the system capacity.
c. Future readiness-Any additional connection of an application will require security policy change.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Figure 1:
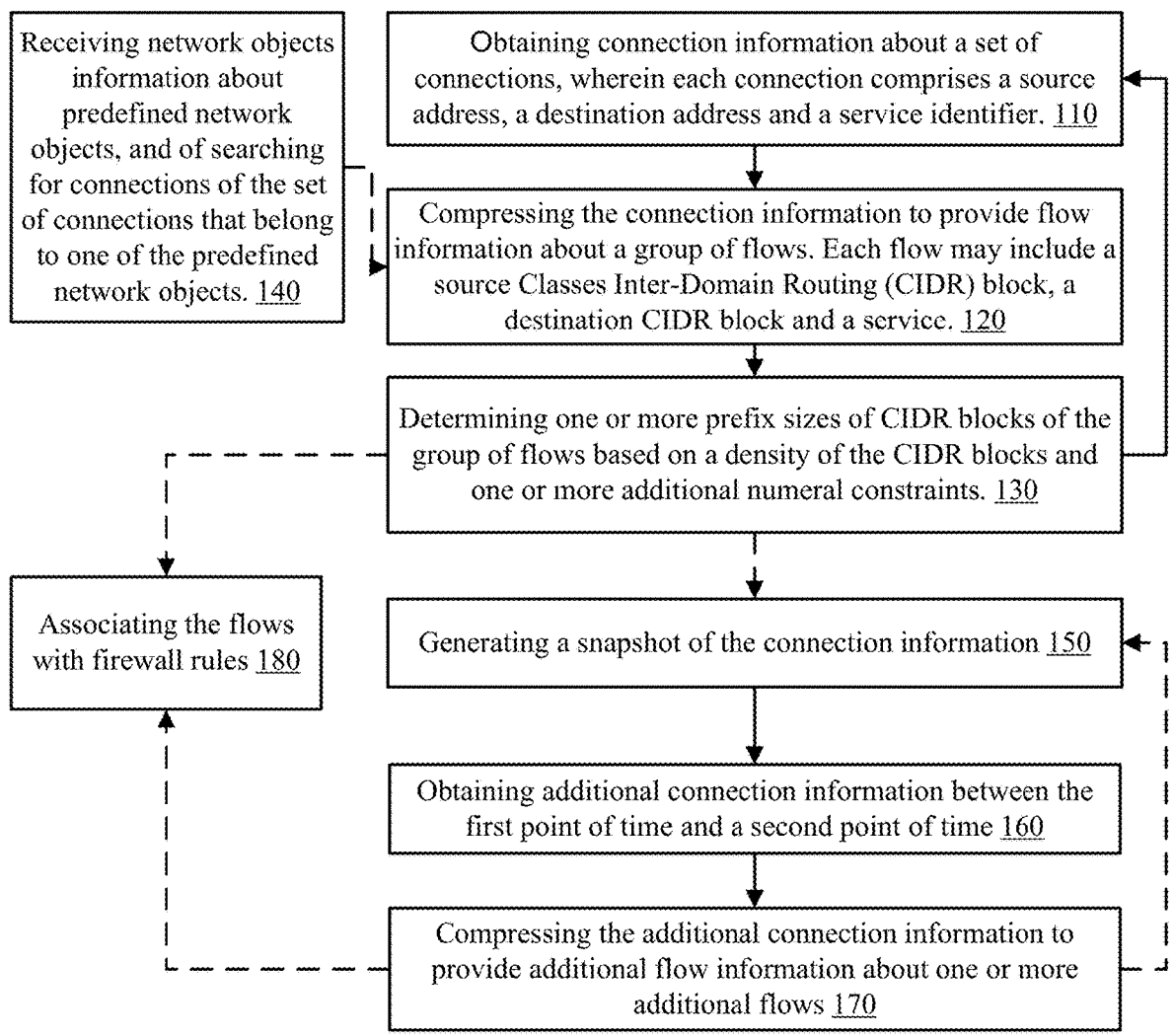
FIG. 1 is an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system. The system or device are a computerized system or device.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any or value mentioned below is merely an example. Other values may be provided-that may exceed the value or may be below the value.

There may be provided a method for flow consolidation and ongoing flow discovery that may overcome complexity, resource utilization and future readiness challenges.

The method consolidates many network connections into a smaller number of consolidated flows.

A consolidated flow is, by definition, wider than the connections it is based on: the flow also represents "shadow" connections that were not present in the input set, yet allow the consolidated flow's representation to be compact. These extra shadow connections also "future-proof" the flow, since they may appear later in time. The method balances between two goals: on one hand, keeping the total number of flows low, while on the other hand, minimizing the amount of shadow connections.

The method may have a "one-time" nature, accepting a set of connections as input and calculating the consolidated flows. However, since the application's network connectivity patterns changes over time, a second aspect of this method allows the method to get ongoing updates regarding network changes and update the consolidated flows accordingly.

The method copes with the complexity challenge by generating a small number of consolidated flows per application—and the small number of flows equate to a smaller number of policy rules, that are easier for the operator to understand and manage.

The method copes with the complexity challenge by generating a small number of consolidated flows per application-reducing the resource utilization-as there is no need for a large amount of resources for a small number of policy rules.

The method copes with the complexity challenge by future readiness by consolidating single IP addresses into CIDR blocks (subnets). The CIDR block may "cover" existing connections and currently unused addresses.

Terms and Definitions a. Network traffic data sources: there are different methods to read and analyze network traffic, in order to obtain a list of connections that occurred over time, for example: an interface listener, port mirroring, flow logs (in a cloud environment), statistical flow data like NetFlow/sFlow, and more.
b. Connection: an entity consisting of a source IP, a destination IP and a service (protocol/port). The input data received from the Network traffic data sources is a set of Connections.
c. Flow: a representation of one or more Connection(s) that is the output of the consolidation process. A Flow can contain one or more source IPs, destination IPs and services. The sources and destinations in a Flow are represented as Network objects.
d. Network object: a logical representation of a set of IP addresses which can be used in the source or destination of a Flow. Each Network object comprises of one or more Subnets, or a group of other Network Objects.
e. A Subnet is a collection of one or consecutive IP addresses Organized into a CIDR Block, such as 192.168.1.0/24, where the number after the "/" is called the "Subnet prefix length"
f. Consolidation: a process in which a set of Connections (source, destination, service) is combined into Flows (s), making it more readable and manageable.
g. Business service: a collection of Connections related to specific servers used for a single business process.
h. Application: a logical collection of Flows related to a single business process.
i. Application network discovery service (ANDS): an application that analyzes network traffic received from Network traffic data sources to identify which Connections relate to which business services. This service has 3 main abilities:
  1. Uses Network traffic data sources to read and analyze network traffic and store it as a set of Connections related to one business service.
  2. Save and store the Business service's Connections as a Snapshot, which represents the Business service's Connections at a given time.
  3. Exposes an API which provides the difference between the Business service's current set of Connections and the Snapshot.
j. Application driven network management system (ADMN): a service used to manage Flows in the context of Applications and enable pushing the flows into firewalls as rules.
k. Discovery: a process in which network Connections from the Application network discovery service are imported into an Application driven network management system to create Application Flows. The discovery process is executed once for each application.
l. Snapshot: a Business service's state at a specific time. Snapshots are used by the Application network discovery service to store the set of Connections of the Business service. A Snapshot has a unique identifier.
m. On-going discovery scheduler: a scheduler for automatic application update in the Application driven network management system.

The Application Discovery Process

The Application Discovery Process is a process in which network traffic is analyzed to create Applications and Flows.

The Network traffic data sources are used as input for Application network discovery service (ANDS), which create a business context for network Connections.

The process which this document focuses on is executed by the Application driven network management (ADMN), which imports the Business services and Connections from the ANDS and optimizes the Connections to create Applications and Flows.

The automatic flows consolidation may receive, per each application, may receive a list of Connections (each consisting of source IP, destination IP and service). The consolidation process creates a flow for each service, which aggregates all the Connections for the given service.

The automatic flow consolidation method may makes use of the following parameters:
a. MAX_FLOWS: a parameter that defines the maximum number of Flows in a single application. Default may be 50 or any other value.
b. MIN_RANGE: minimum Subnet CIDR to use when replacing IPs with ranges. Default is 28, which means the minimal IP/CIDR is x.x.x.x/28.
c. MAX_OBJECTS: the maximum number of source/destination IP addresses in a single Flow. Default may be 15 or any other value.
d. MIN_DENSITY: fraction between 0-1 that represents the minimal percentage of IPs required to create a CIDR. If the value is "auto", it is the result of the next formula:

$$\text{round}(40\hat{\,}(\log(\text{range size})/\log(2)/8),0)$$

e. Object mapping file: a CSV file that maps specific IP addresses to existing Network object.

The method may also take into account the following:
a. The source and destination fields in the flow consist of one or more CIDR blocks.
b. The number of CIDR blocks in the source and destination is limited by a parameter MAX_OBJECTS
c. Every Connection is included in at least one combination of a source CIDR and a destination CIDR (i.e., the Connection's source IP is within one of the CIDRs in the Flow's source, and the Connection's destination IP is within one of the CIDRs in the Flow's destination.

d. The CIDR blocks are determine to be as narrow as possible subject to the above constraints: i.e., the prefix length of each CIDR in the source and destination is the longest possible.
e. In order to perform this setting the method uses the notion of the "density" of a CIDR block with respect to a list of IP addresses (that are contained in it). Density is defined as follows:
  i. Let the input be a list of n IP addresses IP1 . . . . IPn, and let C be a CIDR block, with prefix px, that includes IP1 . . . . IPn. Then Density=$n/2^{(32-px)}$
  ii. For example, if the input consists of 3 IP addresses: 10.0.0.1, 10.0.0.2, 10.0.0.5, and C1=10.0.0.0/29 (note that C1 includes the 3 IP addresses) then the density of C1 with respect to its input is $3/2^{(32-29)}=3/8=0.375$.
  iii. This indicates that 25% of the IP addresses included in the CIDR block appear in the input list. For the same input (10.0.0.1, 10.0.0.2, 10.0.0.5) and CIDR block C2=10.0.0.0/24 we get Density=3/256=0.0117; and for C3=10.0.0.0/30 the density is undefined with respect to this input because 10.0.0.5 is not included in C3.

One building block of the method is the sub-method "Ciderize" that accepts a list of n IP addresses as input, and outputs a list of at most MAX_OBJECTS CIDR blocks such that (a) every IP address in the input belongs to one of the CIDR blocks, and (b) the CIDR blocks are as dense as possible.

If an IP address is included in a CIDR block we say that the CIDR block "covers" that IP address.

Note that for any value of MAX_OBJECTS and any number of IP addresses (n) the method succeeds: it is always possible to cover all n IP addresses with the single CIDR block 0.0.0.0/0—with a very low density.

To implement this optimization the Ciderize method uses a "greedy method" that works as follows:
Initialization
  a. Create an empty list called CIDRS.
  b. For every input IP address IPx add the block IPx/32 to CIDRS. Note that IPx/32 contains exactly the IP address IPx, and it has a Density of 1.0 with respect to IPx.
Merging:
  a. If the number of blocks in CIDRS is smaller or equal to MAX_OBJECTS-output CIDRS and halt
  b. Keep the list CIDRS sorted on increasing order of IP addresses.
Else:
  i. For all pairs of adjacent blocks in CIDRS $C_i$, $C_{i+1}$ according to the sorted order, calculate Mi=the smallest merged CIDR block that contains both $C_i$, $C_{i+1}$, and let Di be its Density.
  ii. Let $C_{max}$, $C_{max+1}$ be the pair of adjacent blocks such that the density of their merged CIDR block Mmax is maximal iii. Add the merged CIDR block Mmax to CIDRS, and remove all the blocks in CIDRS that are contained in Mmax
  b. Go to step 1

Note that in each iteration of the loop the method adds one merged CIDR block to the CIDRS list, and removes two or more blocks from it (it always removes $C_{max}$, $C_{max+1}$ and possibly more blocks), thus the total number of blocks in CIDRS decreases by one or more, and so eventually the number will reach MAX_OBJECTS and the method will stop.

Replace known IPs with existing Network objects.
  a. Consolidate IP addresses by creating all the possible CIDRs for these IPs and finding the most specific ones.
  b. Consolidate flows with similar sources and services to similar flows with multiple destinations.

In order to continuously update discovered applications, after the discovery process is completed, the current state is saved in the Application network discovery service as a Snapshot. The snapshot unique identifier is saved with the application data and used to created diff information between the saved state and the current status.

After each query the current state is saved for the next comparison. When new Connections exist, they are added to the application as new optimized flows.

Discovery Process and Method.

The Application network discovery service reads network traffic from Network traffic data sources and stores Connections as network topology per business service.

The Application driven network management gets the list of business services and Connections from the Application network discovery service.

The Application driven network management creates a list of Flows per application using the consolidation process illustrated below.

Terms a. MAX_FLOWS: a parameter that defines the maximum number of Flows in a single application. Default is 50.
b. MIN_RANGE: minimum Subnet CIDR to use when replacing IPs with ranges. Default is 28, which means the minimal IP/CIDR is x.x.x.x/28.
c. MAX_OBJECTS: the maximum number of source/destination IP addresses in a single Flow. Default is 15.
d. MIN_DENSITY: fraction between 0-1 that represents the minimal percentage of IPs required to create a CIDR. If the value is "auto", it is the result of the next formula:

$$\text{round}(40^\wedge(\log(\text{range size})/\log(2)/8),0)$$

e. Object mapping file: a CSV file that maps specific IP addresses to existing Network object.

Automatic Consolidation Method
  a. The number of created Flows will equal or more then then number of services, even if MAX_FLOWS is smaller.
  b. For each service, optimize the sources:
    i. Replace mapped IPs with existing Network objects from Object mapping file
    ii. Create all possible Subnets for all IPs with CIDR. Subnet size cannot be smaller than MIN_RANGE.
  c. Add Subnets with CIDR/32 for single IPs.
  d. Add all the Subnets that meet the MIN_DENSITY criteria: Go over all Subnets from big to small range and keep only those meeting the minimal density threshold and not already covered by another Subnet. The results Subnets should cover all the IPs.
  e. Reduce the number of Subnets: unite Subnets to larger ranges until the total number of objects in the Flow is smaller than MAX_OBJECTS. Each time, adjusted ranges with highest density are united.
  f. In order to create smaller Flows as possible, first attempt to reach MAX_OBJECTS with Subnets thinner than /24. If it is not wide enough and there are more Network objects than MAX_OBJECTS, try /20, /16, /12, /8 and finally /0.

g. MAX_OBJECTS configuration is stronger than MIN_DENSITY, so in order to keep the number of Network objects less than MAX_OBJECTS, Subnets may be created for ranges that don't meet the density criteria.

Repeat the Consolidation Process for all the Destinations

If the number of services is less than MAX_FLOWS, create up to MAX_FLOWS Flows with more specific data:
  a. For each service, calculate max number of Flows according to the formula (percentage of destination with specific service out of total destinations of the specific application*configured numbers of Flows per application minus mapped destinations)
  b. Reduce number of Subnets for destinations to (calculated max number of Flows*MAX_OBJECTS)
  c. Divide destination Subnets between Flows:

For each Flow, collect sources, replaced mapped IPs and group Subnets so number won't exceed MAX_BJECTS.
  a. Consolidate by source: If two Flows have the same source and service and joint number of destinations is lower than max objects per Flow, then the two Flows will be joint together into one (containing all destinations).

The Application driven network management stores the applications and optimized Flows.

For each application, the Application driven network management calls Application network discovery service to save a Snapshot of the current state and stores the Snapshot ID as part of the Application metadata.

On-Going Application Update Process

Once the time defined by the On-going discovery scheduler passed, the next process is executed for each discovered application:
  a. Send a request to Network discovery service with the snapshot ID to get a diff between the current business service topology and the state that was saved as snapshot during the last update.
  b. If new Connections were added since the last snapshot was saved, create additional Flows in the relevant application using the consolidation process described in item B.3.
  c. Existing Flows are not changed or deleted and removed Connections are ignored.
  d. Call Application network discovery service to save a Snapshot of the current state and store the Snapshot ID as part of the Application metadata.

FIG. 1 illustrates method 100 that may be implemented by a computerized system for flow consolidation.

Method 100 my start by step 110 of obtaining connection information about a set of connections, wherein each connection comprises a source address, a destination address and a service identifier.

Step 110 may be followed by step 120 of compressing the connection information to provide flow information about a group of flows. Each flow may include a source Classless Inter-Domain Routing (CIDR) block, a destination CIDR block and a service.

The compressing may include step 130 of determining one or more prefix sizes of CIDR blocks of the group of flows based on a density of the CIDR blocks and one or more additional numeral constraints.

Step 130 may include maximizing the prefix sizes of CIDR blocks of the group of flows.

The one or more additional numeral may include a maximal number of flows per application and a number of services per application.

The one or more additional numeral constraints may include a maximal number of addresses per flow, the addresses are selected out of source address and destination address.

Step 130 may include determining of the one or more prefix sizes of CIDR blocks of the group of flows comprises ignoring a minimal density constraint in order to comply with the maximal number of addresses per flow.

Step 120 may include performing multiple compression iterations.

At least one flow may include IP addresses of connections that did not appear in the set of connections. Thus—the compressing may provide a basis for managing IP addresses that will appear in the future.

Method 100 may also include step 140 of receiving network objects information about predefined network objects, and of searching for connections of the set of connections that belong to one of the predefined network objects.

When method 100 includes step 140 then step 120 may be based on the network objects information. For example—the compressing may be executed without overriding a mapping of a connection and a predefined network object associated with the connection.

Step 120 may be modular in the sense that it may include determining source CIDR groups, determining destination CIDR groups, and determining the group of flows based on the source CIDR groups and the destination CIDR groups.

Steps 110, 120, 130 and 140 may be executed once or more times. The execution of these steps may be done each predefined time period, according to any schedule, in response to an event (for example—a security breach), and the like.

An effective manner to execute multiple repetitions of steps 110, 120, 130 and 140 may include applying a current repetition on connection information gained between the current repetition and the last repetition that precedes the current repetition.

Assuming that the obtaining of the connection information is completed as a first point of time, then method 100 may include step 150 of generating a snapshot of the connection information.

Step 150 may be followed by step 160 of obtaining additional connection information between the first point of time and a second point of time.

Step 160 may be followed by step 170 of compressing the additional connection information to provide additional flow information about one or more additional flows.

Step 170 may include merging the flow information obtained during step 130 with the additional flow information.

Method 100 may also include step 180 of associating the flows with firewall rules. Step 190 may also include applying the firewall rules, sending the firewall rules to a firewall, and the like.

Figure 2:
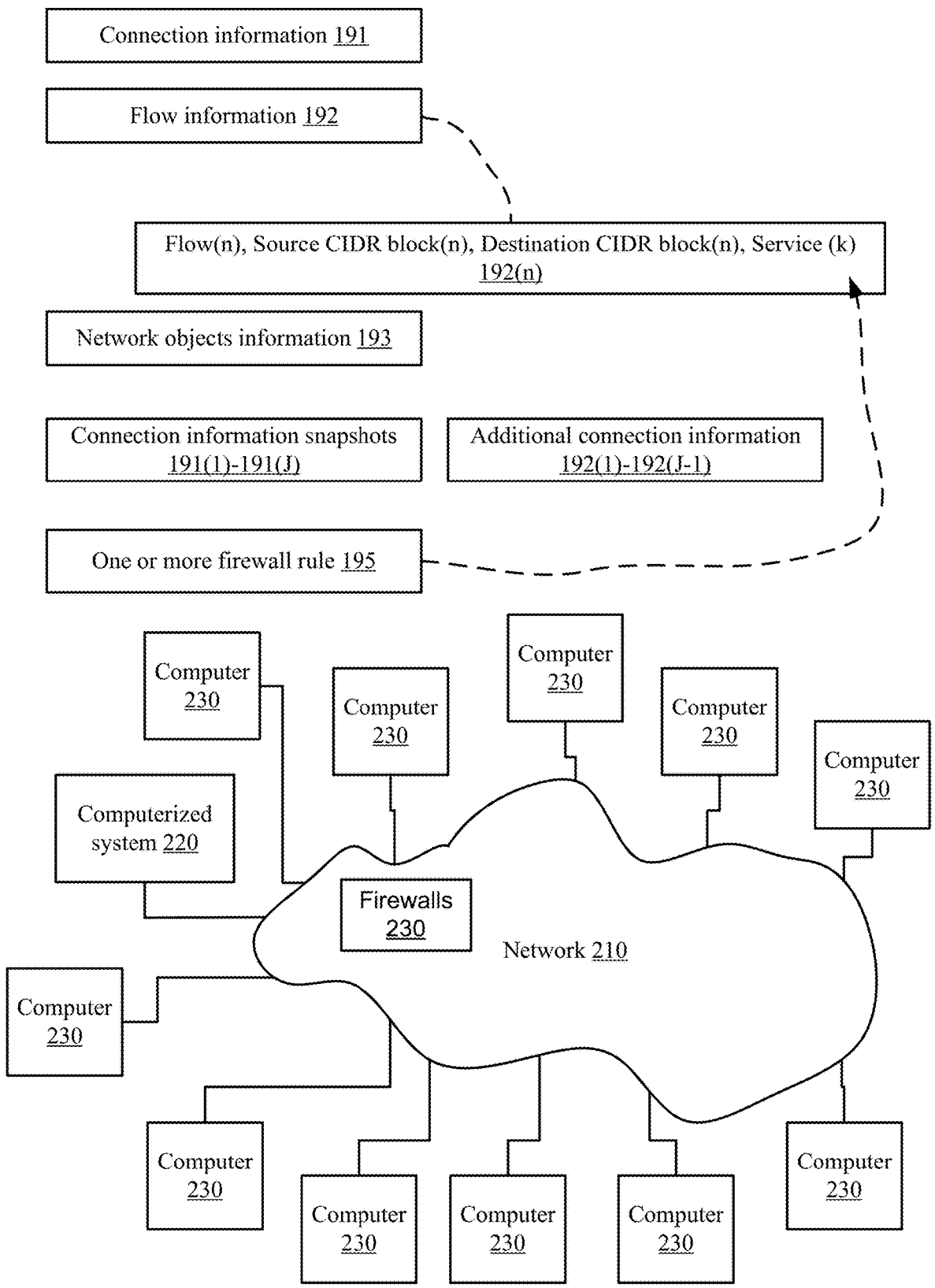
FIG. 2 is an example of data entities, a computerized system and its environment.

FIG. 2 illustrates examples of data entities, a computerized system and its environment.

The data structures include connection information 190, flow information 192, network objects information 193, connection information snapshots 191(1)-191(J), additional connection information 192(1)-192(J−1), one or more firewall rules 195.

There may be N flows and the n'th flow information may include fields such as flow identifier (Flow (n)), source CIDR block (n), destination CIDR block (n), and service (k). It may also include a firewall rule (or more than one) associated with the n'th flow. The additional connection information are the differences (delta) between the connection information of consecutive snapshots (for example—the j'th additional connection information may be the difference between the (j+1)'th and the j'th connection information snapshots.

FIG. 2 also illustrates the computerized system 220 that executes method 100, network 210 (illustrated as including firewalls 230) and multiple computers 230 that may communicate over network 210 using connections.

Figure 3:
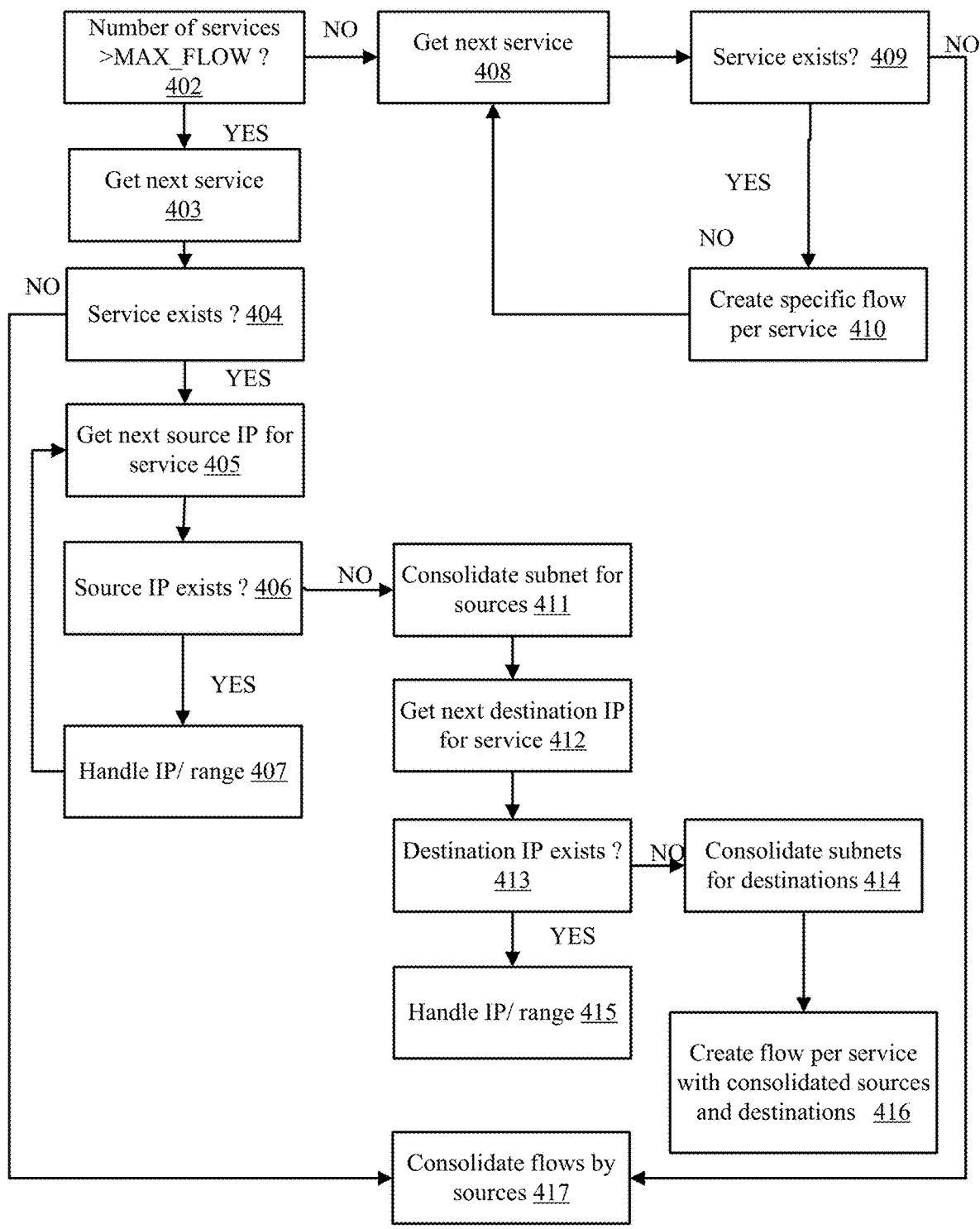
FIG. 3 is an example of a method.
Figure 4:
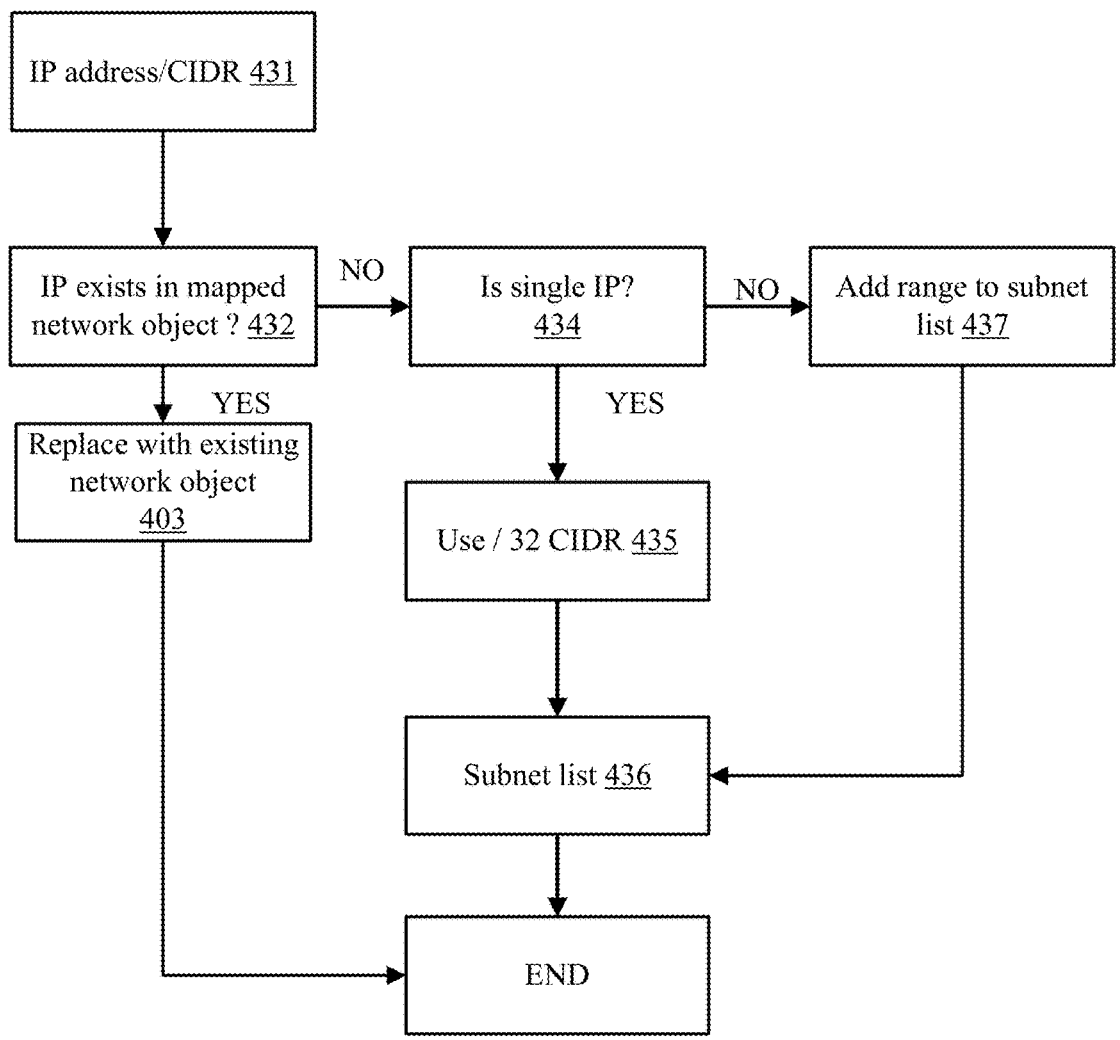
FIGS. 4-7 are examples of various steps of the method of FIG. 3.

FIG. 3 is an example of a method 400 that may start by step 402 of checking whether the number of services exceed MAX_FLOW (s402)—if so getting the next service (S403), checking if the service exists (S404)—if yes—getting the next source IP for the service (S405), checking of the source IP exists (S406)—if yes handling IP/range (S407) and jumping to step 405.

If in step 402 the answer is negative-getting the next service (S408), checking if the service exists (S409) and is yes creating a specific flow per service (S410) and jumping to step 408.

If in step 404 the answer is negative-consolidating flows by sources (S417).

If in step 406 the answer is negative-consolidating subnet for sources (S411), getting next destination IP for service (S412), checking if the next destination IP exists (S413)-if so handling IP/range 415).

If in step 408 the answer is negative-consolidating flows by sources (S417).

If in step 413 the answer is negative-consolidating subnets for destinations (S414) and creating a flow per service with consolidated sources and destinations (S416).

Figure 5:
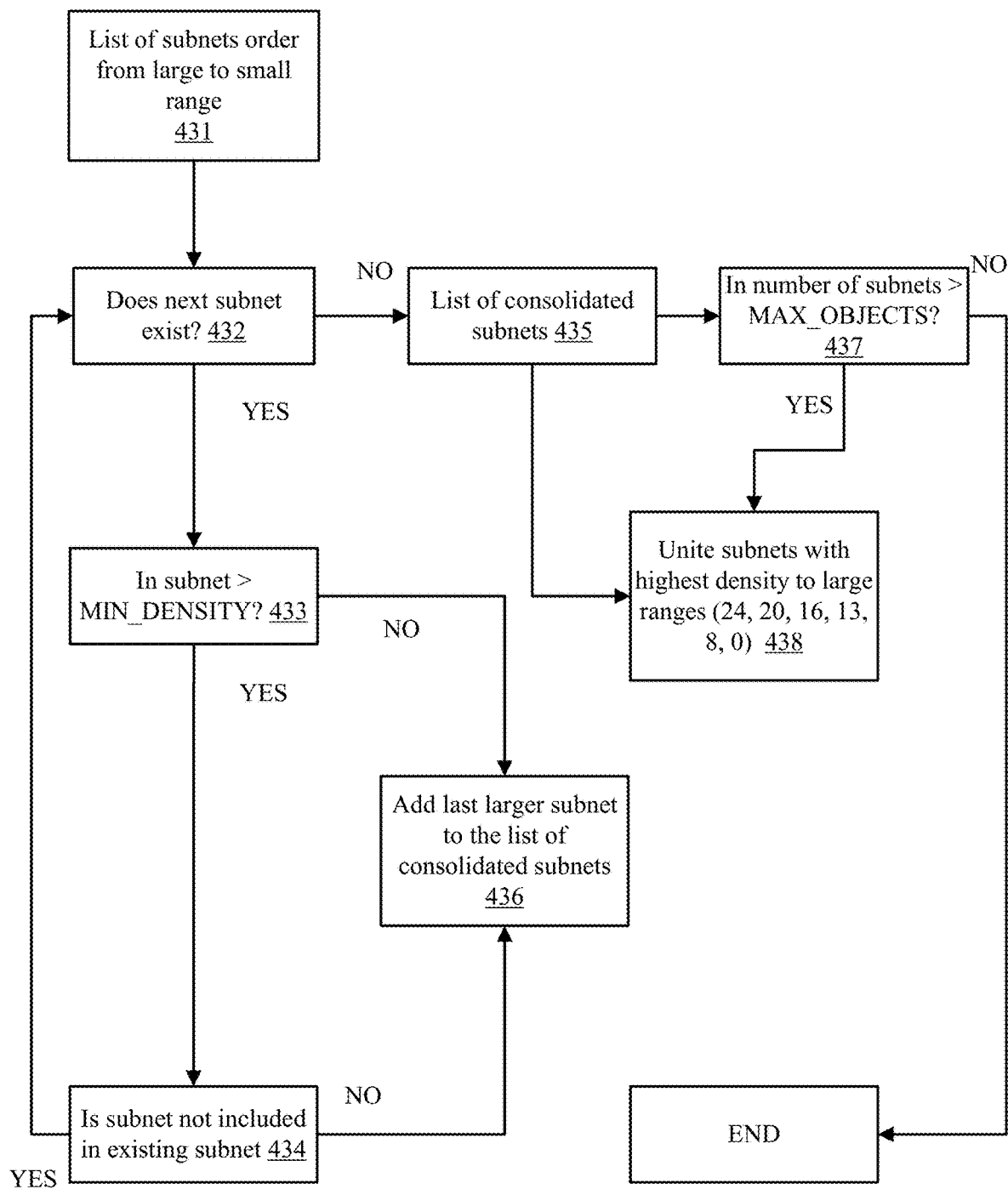

FIG. 5 is an example of a step 415 of method 400.

Step 415 may start by getting IP addresses/CIDR (S431), checking of IP exists in mapper network object (S432) if yes-replacing with existing network object (S403) and END.

If in step 432 the answer is negative-checking if there is a single IP (S434)—and if so using/32 CIDR 435, subnet list (S436) and END.

If in step 434 the answer is negative-adding range to subnet list (S437) and jumping to step 436.

FIG. 5 is an example of a step 411 of method 400.

Step 411 may start by getting a list of subnets order from large (S431) and checking does the next subnet exist (S432)—if yes checking if subnet>MIN_DENSITY (S433) and if so checking if the subnet is not included in existing subnet (S434).

If in step 432 the answer is negative-obtaining a list of consolidated subnets (S435) and uniting subnets with highest density to large ranges (S438). S435 is also followed by checking if the number of subnets>MAX_OBJECTS (S437) and if so-uniting subnets with highest density to large ranges (S438).

If in step 433 the answer is negative adding last larger subnet to the list of consolidated subnets (S436).

If in step 437 the answer is negative—END.

Figure 6:
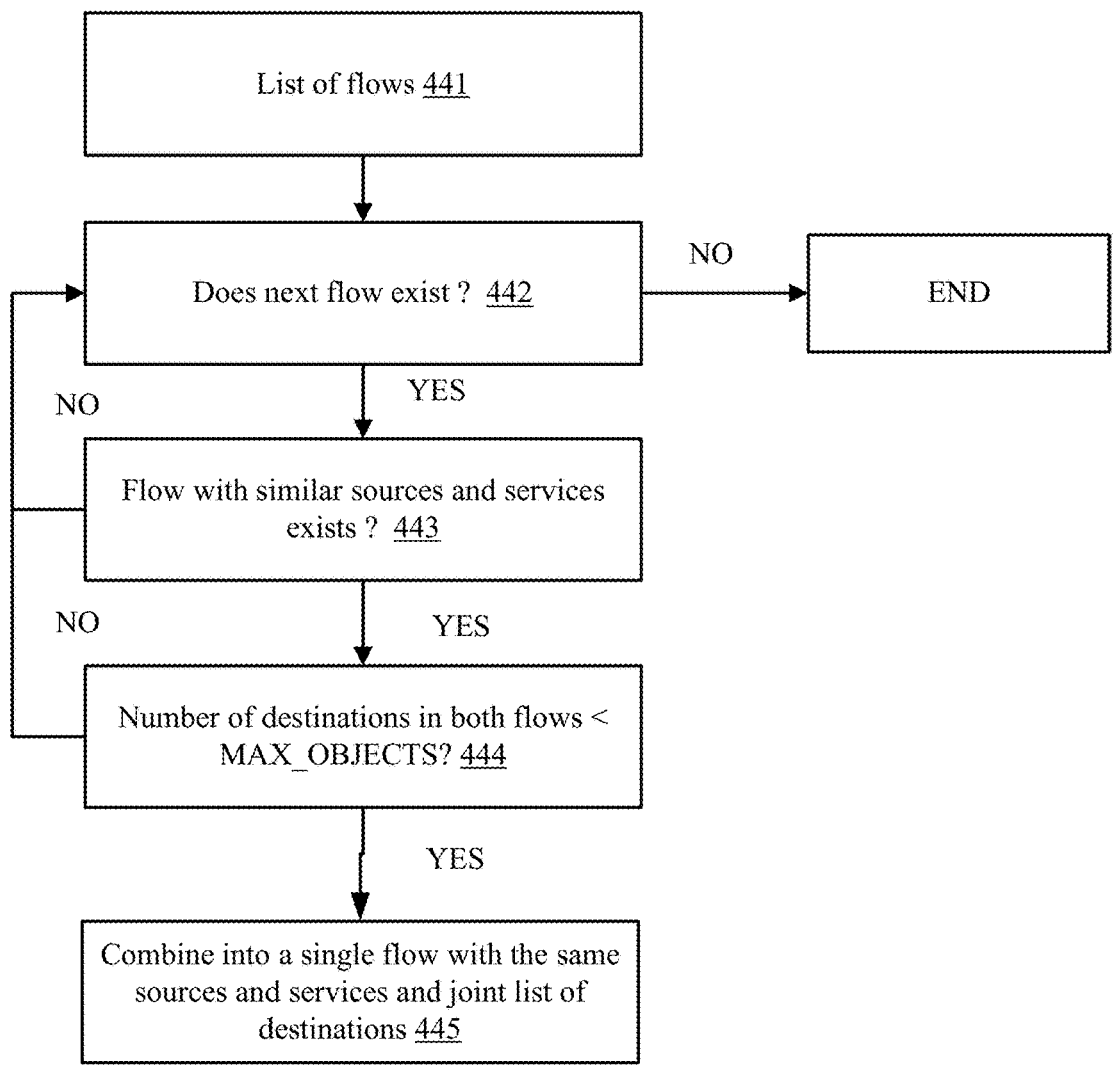
Figure 7:
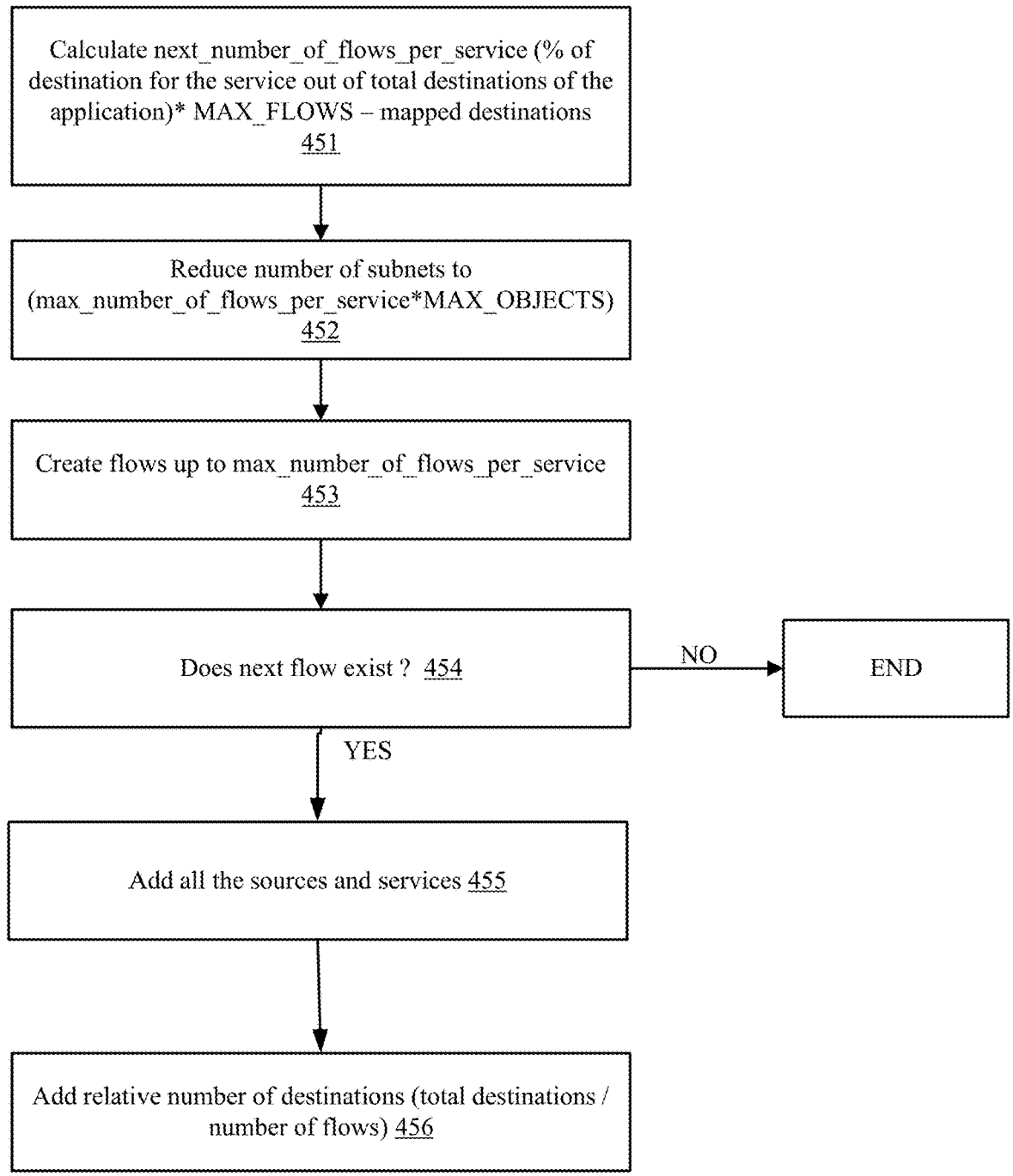

FIG. 6 is an example of a step 417 of method 400.

Step 417 starts by obtaining a list of flows (S441), checking if does a next floe exists (S422)—if no then END—if yes checking if a flow with similar sources and services exists (S443)—if yest checking whether the number of both flows<MAX_OBJECTS (S444) and if yes combining into a single flow with the same sources and services and joint lists of destinations (S445).

In in step 443 or 443 the answer is negative-jumping to step 442.

FIG. 6 is an example of a step 416 of method 400.

Step 416 includes a sequence of steps 451, 452, 435, 454, 455 and 456. Step 454 is a query step and only if the response is negative then step 454 is followed by END instead of the nest set pf the sequence (S455).

Step 451 includes calculating next_number_of_flows_per_service (% of destination for the service out of total destinations of the application)*MAX_FLOWS-mapped destinations.

Step 452 includes reducing the number of subnets to (max_number_of_flows_per_service*MAX_OBJECTS).

Step 453 includes creating flows up to max_number_of_flows_per_service.

Step 454 includes checking if the next flow exists.

Step 455 includes adding all the sources and services.

Step 456 includes adding a relative number of destinations (total destinations/number of flows).

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method implemented by a computerized system for flow consolidation, the method comprises:
    obtaining connection information about a set of connections, wherein each connection of the set of connections comprises a source address, a destination address and a service identifier; and
    compressing the connection information to provide flow information about a group of flows;
    wherein each flow of the group of flows comprises a source Classless Inter-Domain Routing (CIDR) block, a destination CIDR block, and a service;
    wherein the compressing comprises determining one or more prefix sizes of the source CIDR block of the group of flows and one or more prefix sizes of the destination CIDR block of the group of flows based on a density of the source CIDR block, a density of the destination CIDR block and one or more additional numeral constraints; and
    wherein the source CIDR block and the destination CIDR block each contains a list, the list comprises n number of Internet Protocol (IP) addresses, the n number of IP addresses have a prefix of a given length px, and the density of the source CIDR block and the density of the destination CIDR block each equals to $n/(2^{(32-px)})$.

2. The method according to claim 1, wherein the determining comprises maximizing the one or more prefix sizes of the source CIDR block and the destination CIDR block of the group of flows.

3. The method according to claim 1, wherein the one or more additional numeral constraints comprises a maximal number of flows per application and a number of services per application.

4. The method according to claim 1, wherein the one or more additional numeral constraints comprises a maximal number of addresses per flow, the addresses are selected out of source addresses and destination addresses.

5. The method according to claim 4, wherein the determining of the one or more prefix sizes of the source CIDR block and the destination CIDR block of the group of flows comprises ignoring a minimal density constraint in order to comply with the maximal number of addresses per flow.

6. The method according to claim 1, wherein the compressing comprises performing multiple compression iterations.

7. The method according to claim 1, comprising receiving network objects information about predefined network objects;
    searching for connections of the set of connections that belong to one of the predefined network objects; and
    wherein the compressing is executed based on the network objects information.

8. The method according to claim 7, wherein the compressing is executed without overriding a mapping of a particular connection and a predefined network object associated with the particular connection.

9. The method according to claim 1, wherein the compressing comprises determining source CIDR groups, determining destination CIDR groups, and determining the group of flows based on the source CIDR groups and the destination CIDR groups.

10. The method according to claim 1, wherein the obtaining of the connection information is completed as a first point of time;
    wherein the method further comprises:
    obtaining additional connection information between the first point of time and a second point of time; and
    compressing the additional connection information to provide additional flow information about one or more additional flows.

11. The method according to claim 10, comprising obtaining a snapshot of the connection information.

12. The method according to claim 1, wherein at least one flow comprises IP addresses of connections that did not appear in the set of connections.

13. The method according to claim 1, comprising associating the group of flow with firewall rules; and
    applying the firewall rules on traffic.

14. The method according to claim 1, comprising allocating the IP addresses of the list to the source CIDR block and the destination CIDR block so that every IP address of the IP addresses of the list belongs to one of the source CIDR block and the destination CIDR block.

15. A non-transitory computer readable medium that stores instructions for flow consolidation which when executed by a processor cause the processor to:
    obtain connection information about a set of connections, wherein each connection of the set of connections comprises a source address, a destination address and a service identifier; and
    compress the connection information to provide flow information about a group of flows;
    wherein each flow of the group of flows comprises a source Classless Inter-Domain Routing (CIDR) block, a destination CIDR block, and a service;
    wherein the compress comprises determine one or more prefix sizes of the source CIDR block of the group of flows and one or more prefix sizes of the destination CIDR block of the group of flows based on a density of the source CIDR block, a density of the destination CIDR block and one or more additional numeral constraints; and
    wherein the source CIDR block and the destination CIDR block each contains a list, the list comprises n number of Internet Protocol (IP) addresses, the n number of IP addresses have a prefix of a given length px, and the density of the source CIDR block and the density of the destination CIDR block each equals to $n/(2^{(32-px)})$.

16. The non-transitory computer readable medium according to claim 15, that stores instructions which when executed by the processor cause the processor to associate the group of flow with firewall rules; and
    apply the firewall rules on traffic.

17. The non-transitory computer readable medium according to claim 15, wherein the non-transitory computer readable medium stores instructions which when executed by the processor cause the processor to allocate the IP addresses of the list to the source CIDR block and the destination CIDR block so that every IP address of the IP addresses of the list belongs to one of the source CIDR block and the destination CIDR block.

* * * * *